Sept. 10, 1946.   K. B. GILLMORE ET AL   2,407,414
VARIABLE PITCH PROPELLER
Filed July 7, 1942

INVENTORS
KENNETH B. GILLMORE
GEORGE H.F. BROWN
BY
Reynolds Beach
ATTORNEYS

Patented Sept. 10, 1946

2,407,414

UNITED STATES PATENT OFFICE 2,407,414

VARIABLE PITCH PROPELLER

Kenneth Bryan Gillmore and George Henry Fitzroy Brown, Hatfield, England, assignors to The De Havilland Aircraft Company Limited, Hatfield, England Application July 7, 1942, Serial No. 450,031
In Great Britain April 15, 1941

2 Claims. (Cl. 170—135.6)

The present invention consists in a variable pitch airscrew pitch control mechanism comprising a gear train for operative connection between the airscrew blades and a pitch-change drive input gear, said gear train being constituted by two sun gears mounted coaxially of the airscrew shaft, and reversing gearing operating between the two sun gears and carried by a rotatable cage mounted coaxially of the airscrew shaft; one of the sun gears also operatively engaging the pitch-change drive input gear, whereas the other meshes also with a pitch-change drive output gear operatively connected to the airscrew blades.

Such pitch-change mechanism presents the advantage that it is capable of such standardisation that it may be installed either as pitch-change transmission gearing in a single airscrew, or as duplicator means between the front and rear airscrews of a counter-rotating airscrew assembly; or between any two or more alternately oppositely rotatable airscrews disposed in tandem.

The arrangement further provides duplicator mechanism in simple form for interposition between two airscrews disposed in tandem, or between the front and rear airscrews of a counter-rotating airscrew assembly, such as will in operation ensure precisely equal and opposite pitch-change in both interrelated airscrews.

Figure 1:
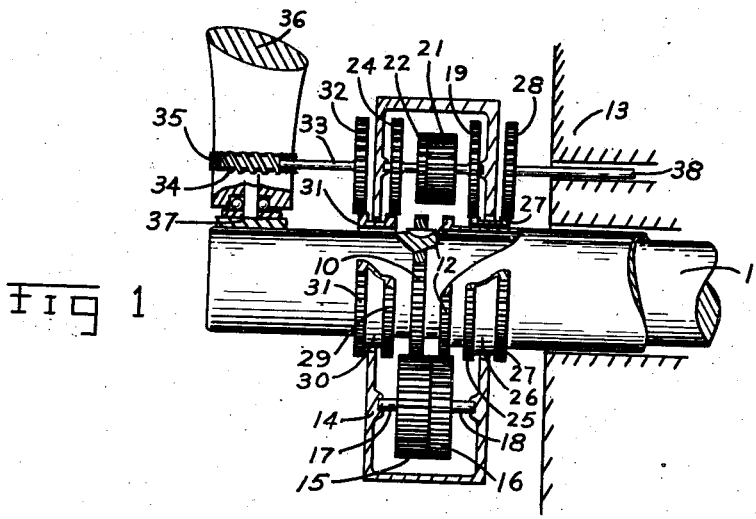
Figure 2:
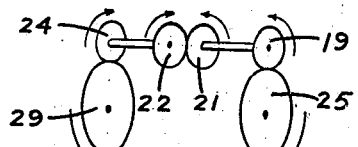

In order that it may be clearly understood and readily carried into effect, the invention is hereinafter described with reference to the accompanying diagrammatic drawing, of which:

Figure 1 indicates very diagrammatically airscrew pitch control mechanism according to the invention applied to a single airscrew;

Figure 2 is an isometric view illustrating the nature of the reversing gearing included in the planet trains; while Figure 3 is, again, a very diagrammatic illustration of the invention as applied for pitch-change control of both airscrews of a counter-rotating airscrew assembly.

Referring first to Figures 1 and 2, the sun wheel 10 is fixed on the airscrew shaft 11 and thus rotates with it; whereas the sun wheel 12 is fixed against rotation under restraint of the means connecting it, for example to the engine, indicated at 13. A planet-carrying cage 14 is mounted for rotation as a whole about the airscrew shaft 11 and mounts two sets of planets or reversing gearing.

The first set of planet or reversing gearing is constituted by the reversing pinions 15 and 16, of which the pinion 15 is rotatable about the axis of the shaft 17 carried by the cage 14, while the pinion 16 is rotatable about the shaft 18, also carried by the cage 14. The pinions 15 and 16 intermesh; the pinion 15 also meshes with the sun wheel 10; whereas the pinion 16 meshes with the sun wheel 12. It thus follows that, since in the arrangement shown in Figure 1 the gearing may be presumed to be symmetrical about the reversing pinions 15 and 16, the cage 14 rotates as a whole about the airscrew shaft at half the speed of the airscrew shaft 11 and in the same direction as the shaft.

The second set of planet gearing is constituted by the planet 19 fixed on the shaft 20 carried by the cage, which shaft 20 also mounts the reversing pinion 21. The reversing pinion 21 meshes with the cooperating reversing pinion 22 fixed on the shaft 23 carried by the cage, upon which shaft is mounted the planet 24. The planet 19 meshes with the annulus 25 of the sun wheel 26; whereas an annulus 27, similar to 25, meshes with the pitch-change drive input gear 28. Likewise, the planet 24 meshes with the annulus 29 of the sun wheel 30, which also has the annulus 31 meshing with a pitch-change drive output gear 32 on the shaft 33. The shaft 33 mounts the worm 34, which engages the worm wheel 35 directly connected to the shank of the airscrew blade, represented at 36, which is rotatable about the spider arm 37 fixed on the airscrew shaft 11.

The pitch-change drive input gear 28 is fixed on the pitch-change drive shaft 38 rotatable by any convenient means, such as a manually-operable device, an electric motor, or an hydraulic motor; or the shaft 38 may be engine-driven with provision for drive reversal.

Figure 2 in its isometric form shows the reversing pinions 21 and 22 intermeshing for drive reversal through the planet train; and it will be realised that the reversing pinions 15 and 16 operate in the same way between the sun wheels 10 and 12. In practice, the shafts 17, 18, 20 and 23 will extend right across the cage 14, but for purposes of diagrammatic representation those shafts have been shown extending from one side of the cage to the adjacent side of the nearest reversing pinion.

The operation of the transmission gear shown and described with reference to Figures 1 and 2 is as follows: Rotation of the airscrew shaft 11, taking with it the sun wheel 10, the spider arm 37, together wtih the blade shank represented at 36, drives the reversing pinion 15. The reversing pinion in its turn meshes with the reversing pinion 16, but the pinion 16 cannot rotate freely because it meshes with the stationary sun wheel 12. As stated, therefore, the cage rotates in the same direction as the airscrew shaft 11 at half the speed thereof. The spider arm 37 can be regarded as a member integral with the airscrew shaft 11, so that the airscrew hub is also rotating with the airscrew shaft; and so long as no pitch-change operation is in progress, the pitch-change drive output gear 32 must not rotate about the axis of its shaft 33. Therefore, the gear 32 and the sun annulus 31 rotate about the axis of the shaft 11 as though they were interlocked, and the sun annulus 29 therefore also rotates at the same speed as the airscrew hub, transmitting drive through the planet 24, reversing pinions 22 and 21, so that the planet 19 rotates on the shaft 20 in the opposite direction to that of the planet 24 about the shaft 23. The transmission therefore resolves itself into a system whereby, although the sun annulus 25 is in a sense rotating oppositely with respect to the airscrew hub, it is in fact stationary with respect to the engine or some other stationary part, as indicated at 13.

For pitch-change operation, the shaft 33 is driven in the required sense, with the result that the pitch-change input gear 28 rotates in the same sense; and, by virtue of its engagement with the sun annulus 27, either adds to or subtracts from the normal speed of rotation of the gear 19.

At this stage it is well to emphasize again the diagrammatic nature of the drawing, for to deal with loads likely to be encountered in pitch-change operation reduction gearing may have to be introduced as between the pitch-change transmission mechanism and the pitch-change drive.

Referring now to the arrangement shown in Figure 3, wherein the pitch-change mechanism is applied to a counter-rotating airscrew assembly, the pitch-change transmission mechanism operating between the pitch-change drive input gear and the rear airscrew is the same as that shown and described with reference to Figures 1 and 2. The required duplication and reverse rotation as between the two airscrews, however, involve the duplication of the pitch-change mechanism. Thus, the pitch-change which is made by the mechanism described and illustrated with reference to Figure 1 is transmitted forwardly past the rear airscrew 36, so that the gear 23', under the influence of the pitch-change drive input gear 28 of the rear airscrew, rotates in the same sense and direction as the opinion 32, and thus becomes the pitch-change drive input gear for the more forward airscrew, as represented by the blade shank 36'. The arrangement of the reversing pinions 15', 16' and shafts 17', 18' in the cage 14' is the same as that of the parts 15, 16, 17 and 18 of Figure 1; but, be it noted, the reversing pinion 15' meshes with the sun annulus 19A on the forward airscrew shaft 11A; whereas the reversing pinion 16' meshes with both the reversing pinion 15' and the sun gear 12A fixed on the rear airscrew shaft 11, which is tubular to accommodate the airscrew shaft 11A; and in consequence it follows that the cage 14', assuming symmetry of the gearing, will rotate at the mean speed of the two airscrews, thus assuming symmetry of the duplicator gearing about the reversing pinions 21', 22'; and also assuming that the airscrew shafts 11 and 11A are rotating at the same speed but in opposite senses, then the cage 14' will remain stationary. Again, as with the arrangement described with reference to Figure 1, pitch-change will occur if the more forward airscrew pitch-change drive output gear 32' is caused to rotate about the axis of its shaft 33'; and it therefore follows that so long as no pitch-change operation is in progress the gear 32' has to rotate interlocked with the sun annulus 31' about the axis of the airscrew shaft 11A. The sun annulus 29' rotates similarly to effect rotation of the planet 24' about its shaft 23'. Rotation of the shaft 23' is reversed through the reversing pinions 22' and 21', shaft 20', with the result that the sun annulus 25' rotates in a sense which, though reverse to the sense of rotation of the sun annuli 29', 31', in fact results in the annulus 25' remaining stationary about the axis of the outer airscrew shaft 11. The additive or subtractive effect caused by rotation of the forward airscrew pitch-change drive input gear 28' about its axis causes a change in the rotation of the gear 19', in accordance with the sense of rotation, with consequent transmission of pitch-change drive. Symmetry of the gear about the reversing pinion ensures precisely equal and opposite pitch-change as between the blade shanks 36 and 36'.

Figure 3:
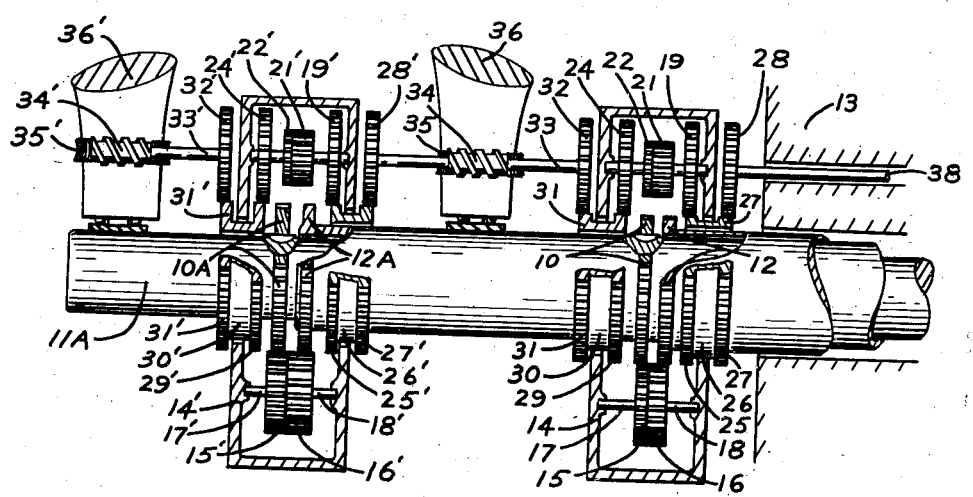

It is to be understood that the transmission mechanism by which the pitch-change operation is transmitted to the rear airscrew assembly, indicated by the blade shank 36 in Figure 3, may be of any convenient type. Figure 3, however, serves to show an arrangement in which the transmission is virtually duplicated in a counter-rotating airscrew so as to serve, not only for transmission of pitch-change drive to the rear airscrew assembly, but also as duplicator mechanism for operation between the rear and forward airscrews of a counter-rotating airscrew assembly so as to ensure precise equality of pitch-change but in opposite senses.

As above stated, equality of pitch-change results from the symmetry of the gear about the axis of the pitch-change reversing pinions 21', 22'; and if a situation should arise wherein a predetermined inequality of pitch-change is required as between the front and rear airscrew of a counter-rotating airscrew assembly, it can be provided by deliberately designing the pitch-change gearing of the duplicator asymmetrically about the reversing pinions 21', 22'.

The function of the reversing pinions 15, 16, 15', 16' is not immediately apparent, and it is therefore desirable to explain that they operate to control rotation of the cage 14 or 14', as the case may be. If the reversing pinions 15, 16, 15', 16' were not provided there would be nothing to take the reaction of pitch-change transmission loads and in that event driving of the pitch-change input gear would, against any appreciable blade loads, merely result in movement of the cage.

What we claim is:

1. Control mechanism for variable pitch airscrews, comprising a pitch-change input drive gear, a cage mounted coaxially of and for rotation relative to the airscrew shaft, pitch-change control gearing and pitch-change reaction gearing; each such set of gearing including two spaced shafts journaled within said cage and a gear on each shaft intermeshing to reverse the relative sense of rotation of the two shafts, the reversing gears of one set being split to locate one half axially distant from the companion intermeshing half on each shaft thereof, the pitch-change reaction gearing further including a sun gear within the cage rotatable with the airscrew shaft and meshed with one of its reversing gears, and a second sun gear within the cage secured to a static anchorage and meshed with the second of its reversing gears; the pitch-change control gearing further including a split sun gear, one half being external of the cage and operatively connected to the pitch-change input drive gear and the other half being internal of the cage and meshed with the distant half of one of the split reversing gears, and also including a second split sun gear, of which one half is internal of the cage and meshes with the distant half of the second of the split reversing gears, and the other half is external and operatively connected to the airscrew blades.

2. Control mechanism for a counter-rotating tandem variable pitch airscrew assembly which includes an inboard and an outboard airscrew, and a pitch-change input drive gear, such control mechanism comprising pitch-change control gearing and pitch-change reaction gearing for each such airscrew; each such set of gearing comprising two sun gears mounted coaxially of its respective airscrew shaft and reversing gearing operatively interposed between them; a cage mounted coaxially of and rotatable with respect to the airscrew shafts, supporting and enclosing both sets of reversing gearing; the sun gears of the pitch-change control gearing for the inboard airscrew being operatively connected one to the pitch-change input drive gear and the other with the blades of such inboard airscrew, and the sun gears of the pitch-change reaction gearing for the inboard airscrew being operatively connected one to the shaft of such inboard airscrew, and the other to a static anchorage; the sun gears of the respective sets of gearing for the outboard airscrew being similarly arranged and connected, except that the sun gear of the outboard airscrew which corresponds to the statically anchored sun gear of the inboard airscrew is instead anchored to the shaft of the inboard airscrew, and in that the blade-connected sun gear of the pitch-change control gearing of the inboard airscrew is operatively connected to that sun gear in the outboard airscrew which corresponds to the input drive gear-connected sun gear of the inboard airscrew; said pitch-change control mechanism for each airscrew being organized and arranged to produce pitch-change movements in opposite senses, but of unlike angular extent, as between the blades of the two airscrews.

KENNETH BRYAN GILLMORE.
GEORGE HENRY FITZROY BROWN.